Aug. 11, 1970 P. E. NEMECEK ET AL 3,523,461
TRANSMISSION BELT
Filed May 6, 1968
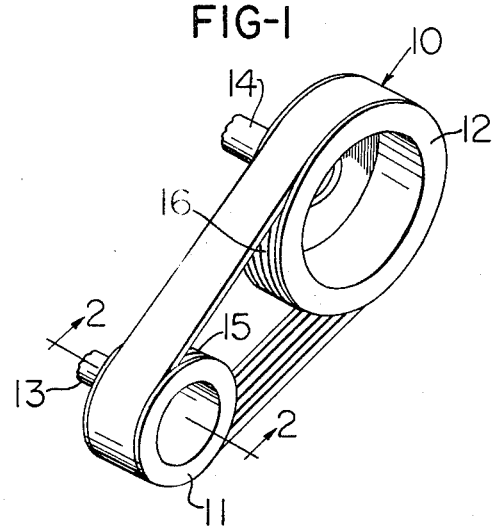
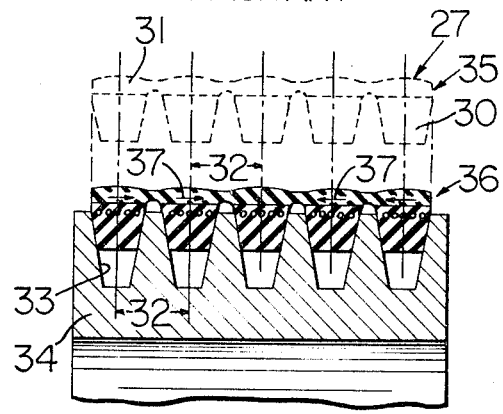
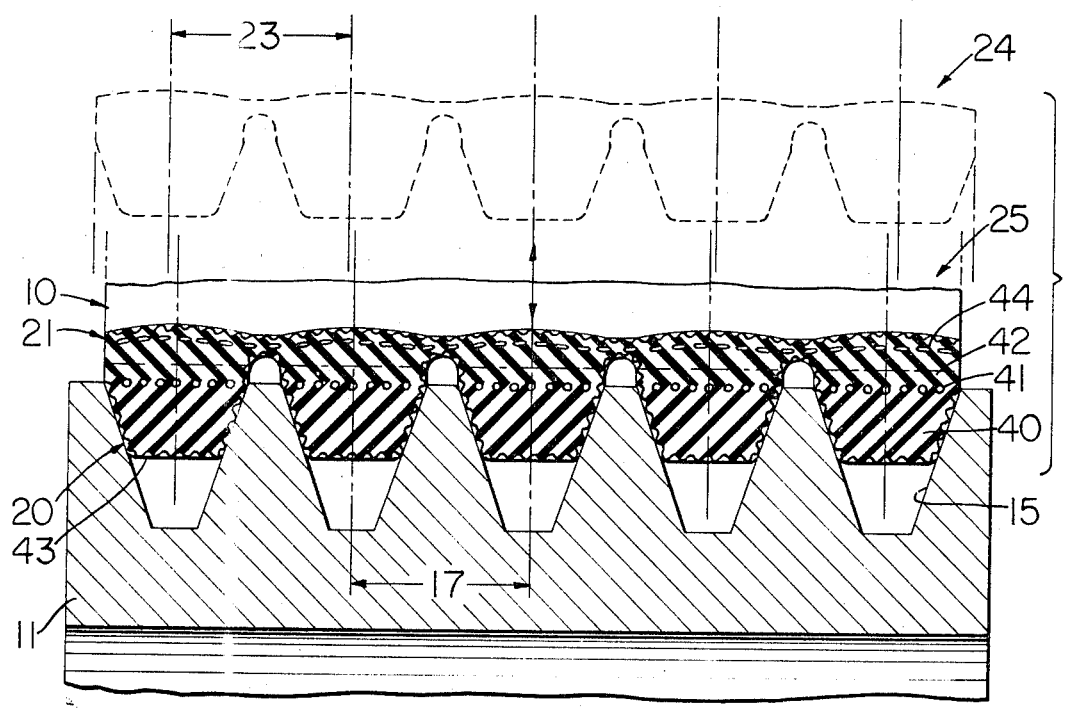
INVENTORS
PAUL E. NEMECEK
DEWEY D. HENDERSON
BY
Reuben Wolk
ATTORNEY United States Patent Office 3,523,461
Patented Aug. 11, 1970

3,523,461
TRANSMISSION BELT
Paul E. Nemecek and Dewey D. Henderson, Springfield,
Mo., assignors to Dayco Corporation, Dayton, Ohio,
a corporation of Delaware
Filed May 6, 1968, Ser. No. 726,908
Int. Cl. F16g 5/16; F16h 7/02
U.S. Cl. 74—229                                    5 Claims

ABSTRACT OF THE DISCLOSURE

A transmission belt having a plurality of substantially identical V-belt elements fastened together by a tie band so that the V-belt elements have a greater center-to-center spacing than the center-to-center spacing beween a plurality of grooves provided in an associated sheave to be used with such transmission belt whereby an improved mating is provided between the V-belt elements and their associated grooves.

BACKGROUND OF THE INVENTION

In many power transmission systems utilizing V-belts it is necessary to utilize a plurality of V-belts operating between a driving and a driven sheave to transmit the necessary power. To help minimize some of the problems created by a plurality of V-belts operating between multiple groove sheaves it has been previously proposed to provide a V-belt assembly wherein the plurality of V-belts are fastened together by a fastening band so that the spacing between centers of the V-belts is the same as the spacing between centers of the grooves in each sheave in which such V-belt assembly is to be used. However, each previously proposed V-belt assembly of this type is deficient because large lateral stresses are set up between the V-belts and their fastening band which tend to separate the fastening band from its V-belts, has poor stability in its associated drive, and has a comparatively short operating life.

SUMMARY

This invention provides an improved transmission belt having a plurality of V-belt elements fastened together by a tie band wherein such transmission belt has optimum stability during operation in an associated sheave, is substantially free of lateral stress between the V-belt elements and its tie band, and has a comparatively long operating life.

Other details, uses, and advantages of this invention will become apparent as the following description of the exemplary embodiment thereof presented in the accompanying drawing proceeds.

BRIEF DESCRIPTION OF THE DRAWING

The accompanying drawing shows an exemplary embodiment of this invention, in which:

FIG. 1 is a perspective view particularly illustrating an exemplary transmission belt of this invention installed in position between a driving sheave and a driven sheave;

FIG. 2 is a greatly enlarged view with parts in section and parts broken away taken essentially on the line 2—2 of FIG. 1 and particularly illustrating by solid lines the arrangement of the transmission belt in position within its associated driving sheave and showing by dotted lines the configuration of such transmission belt prior to insertion in position within the grooves provided in such driving sheave; and FIG. 3 is a smaller view similar to FIG. 2 and particularly illustrating the problem encountered in utilizing previously proposed transmission belts of this general type.

DESCRIPTION OF ILLUSTRATED EMBODIMENT

Reference is now made to FIG. 1 of the drawing which illustrates an exemplary transmission belt of this invention which is designated generally by the reference numeral 10 and is shown installed in position around a driving sheave 11 and a driven sheave 12. The sheave 11 is suitably fastened to a drive shaft 13 and a prime mover such as an electric motor is utilized to drive the shaft 13 and hence the driving sheave 11 in a known manner. In a similar manner, the driven sheave 12 is suitably fastened to a driven shaft 14 which is operatively connected to a machine to be driven.

The sheaves 11 and 12 are preferably of standard construction with the sheave 11 having a plurality of identical grooves 15 provided therein and the sheave 12 having a plurality of identical grooves 16 provided therein. The grooves 15 and 16 provided in the sheaves 11 and 12 respectively have a given center-to-center spacing therebetween and inasmuch as the sheaves 11 and 12 are standard sheaves such given center-to-center spacing is indicated at 17 of FIG. 2 for the sheave 11 and comprises a standard spacing. It will also be appreciated that the spacing provided between each immediately adjacent pair of grooves 16 provided in the driven sheave 12 is also a standard spacing and has the same dimension as indicated at 17 for sheave 11.

As illustrated particularly in FIG. 2 of the drawing, the transmission belt 10 has a plurality of V-belt elements 20 which are adapted to be received within the grooves 15 of the pulley 11 and the grooves 16 of the pulley 12 respectively. The elements 20 are described as being V-belt elements and in this example of the invention each element 20 has a substantially trapezoidal cross-sectional outline; however, it will be appreciated that each element 20 may have any desired configuration of the type commonly used in V-belt constructions.

The transmission belt 10 also has a tie band 21 which is provided as an integral part thereof and fastens the V-belt elements 20 together as an integral unit. The tie band 21 is preferably fastened in position by molding such tie band in position against the upper portion of each of the V-belt elements 20 during the process of making the transmission belt 10 and in a known manner.

As will be apparent particularly from the dotted line showing of the transmission belt 10 in FIG. 2 of the drawing, the V-belt elements 20 have greater center-to-center spacing 23 between each immediately adjacent pair of such elements than the given or standard spacing 17 provided between the grooves 15 and 16 in sheaves 11 and 12 respectively. This greater spacing, shown at 23, beween the V-belt elements is reduced to provide a near perfect mating of the transmission belt 10 with its sheaves 11 and 12 once the belt 10 is installed in position and as will be readily understood from the discussion now to be presented.

Upon installing, i.e., bending, the transmission belt 10 in position around an associated sheave it will be appreciated that there is a tendency for the transmission belt 10 to be stretched longitudinally merely by the act of bending. This tendency for the belt to stretch longitudinally is greatly increased once the belt 10 is used to drive a load and particularly in applications where the transmission belt is used in connection with a clutching drive system. This longitudinal stretching of the transmission belt 10 creates a natural tendency for the width of the belt 10 and particularly of the tie band 21 to decrease in transverse width in a similar manner as the decrease in width that is produced in a wide rubber band once it is stretched. The bending of the transmission belt 10 about an associated sheave and the loading of such belt results in the belt 10 decreasing in width from the dotted line presentation illustrated at 24 in FIG. 2 to the solid line showing illustrated at 25 in such figure.

Thus, it is seen that upon using the transmission belt 10 in association with one or more sheaves such as the sheaves 11 and 12 the transmission belt 10 has forces imposed thereon essentially as briefly described above which tend to reduce the greater center-to-center spacing 23 of the V-belt elements so that the spacing approaches and approximately equals the spacing 17 provided between the grooves 15 and 16 of sheaves 11 and 12. This reduction in center-to-center spacing between the V-belt elements 20 provides an improved mating of the V-belt elements 20 within the cooperating grooves in the sheaves 11 and 12 and thereby substantially increases the operating life of the transmission belt 10.

Reference is no made to FIG. 3 of the drawing to highlight the problems created in utilizing previously proposed transmission belts which are in a similar general category as the belt 10. In particular, it will be seen that FIG. 3 illustrates a transmission belt which will be referred to as a belt assembly which is designated generally by the reference numeral 27 and is essentially comprised of a plurality of V-belts 30 which are fastened together by a fastening band 31. With the belt assembly 27 in an uninstalled condition, the V-belts 30 have a given center-to-center spacing which is designated by the reference numeral 32 which is the same spacing as the spacing, also designated by the numeral 32, provided between corresponding grooves 33 in an associated sheave 34 within which the V-belt assembly 27 is used.

Once the V-belt assembly 27 is moved from the dotted line position illustrated at 35 in FIG. 3 to the solid line position illustrated at 36 and installed around its associated sheave 34 it will be seen that the V-belts 30 are held so they retain their same spacing; however, as the V-belt assembly 27 is bent around the sheave 34 and subsequently used to transmit power, its fastening band 31 (as well as the entire assembly 27) tends to decrease in width in a similar manner as described in detail in connection with the transmission belt 10. In this instance, the V-belts 30 are held firmly in position by their associated sheave 34 whereby the net effect is to impose great lateral stresses between the fastening band 31 and the V-belts 30 indicated by typical arrows 37. The lateral stresses indicated at 37 tend to shear the fastening band 31 from its V-belt portions 30.

This illustration of FIG. 3 highlights one of the many deficiencies of previously proposed transmission belt constructions which are similar to the belt assembly 27. It has also been found that previously proposed belt constructions of this general type are very unstable in their associated sheaves, i.e., tend to "walk off" their sheaves, and the above-mentioned stresses within the assembly 27 not only tend to but often eventually shear the fastening band 31 from the V-belt portions 30. Further, because of the joint action of these factors, previous belt constructions of this general type give poor performance and have comparatively short operating lives.

Referring again to FIG. 2 of the drawing, it will be seen that each of the V-belt elements 20 has a lower compression section 40, a load-carrying section 41 in the central portion thereof, and an upper tension section 42. These sections 40–42 are made of suitable known materials and are of known constructions and thus will not be described in more detail. In addition, the elements 20 of the transmission belt 10 may be provided with a suitable cover which may be in the form of a conventional bias-woven cover fabric 43.

The tie band element 21 is bonded to the V-belt elements 20 adjacent to the tension sections 42 and in particular is bonded to the top portion of such tension sections. The tie band element 21 may have load-carrying cords 44 extending therealong and is also preferably made of a material which has physical properties which are very similar to the physical properties of the tension section 42 so that upon using the transmission belt 10 in an associated drive system the tie band 21 and tension section 42 of the V-belt elements 20 are affected in a similar manner by the external forces operating on such transmission belt during use. In particular, the tie band 21 and the tension section 42 are preferably made of a heat resistant rubber compounded to enable bending and use around sheaves without strain or cracking tendencies.

With the construction of the transmission belt 10 as discussed above it will be seen that the tension induced in the material above the neutral axis of such belt is such that there is a tendency for the transmission belt 10 and in particular the tie band 21 to decrease in width, with each tension section 42 of the V-belt elements also decreasing in width a corresponding amount. Thus, the greater center-to-center distance 23 of the V-belt elements 20 of transmission belt 10 prior to stretching or bending around its associated sheaves is reduced during use of belt 10 so that it is substantially equal to the center-to-center distance provided between the grooves of the sheaves 11 and 12 to provide a near perfect fit of the V-belt elements 20 in their associated grooves and as previously mentioned.

The greater center-to-center spacing provided between the V-belt elements 20 of a relaxed, i.e., unbent or unstretched, belt than between the corresponding center-to-center spacing provided between the grooves of associated sheaves will vary and will be determined by the particular characteristics of the materials utilized in making the transmission belt 10. It has been found that the center-to-center spacing 23 should be at least one-half percent greater than the corresponding center-to-center spacing 17 provided between grooves of an associated sheave. Further, it has been found that excellent results are obtained where such greater center-to-center spacing is generally within the range of 0.5 to 2.0 percent greater than the spacing 17 between grooves of an associated sheave.

The transmission belt 10 presented in this example of the invention illustrates a tie band 21 which is used to tie together a plurality of five V-belt elements 20. However, it will be appreciated that the concept of this invention may be utilized with any desired plurality of V-belt elements 20 being fastened together by an associated tie band. This concept may be used with V-belt elements of all sizes and with all types of cross-sectional configurations. In addition, a transmission belt made in accordance with the teachings of this invention may be effectively utilized with standard sheaves without requiring modification of such standard sheaves.

The transmission belt 10 of this invention is shown in the drawing as being made of rubber and the term rubber is meant to include natural rubber as well as any desired combination of the various synthetic rubber materials. However, the belt 10 may be made of any suitable material.

While a present exemplary embodiment of this invention has been illustrated and described, it will be recognized that this invention may be otherwise variously embodied and practiced within the scope of the following claims.

What is claimed is:

1. In combination: a transmission belt and a cooperating sheave, said sheave having a plurality of grooves formed therein which have a given center-to-center spacing therebetween, said transmission belt having a plurality of V-belt elements adapted to be received within said grooves and having a tie band fastening said V-belt elements together as an integral unit, said V-belt elements having a greater center-to-center spacing therebetween than said given spacing, and with said transmission belt bent around said sheave during use thereof in an associated drive system said belt is stretched longitudinally causing a reduction in the width of said tie band which reduces said greater center-to-center distance spacing of said V-belt elements within said grooves to provide an improved mating of said V-belt elements within said grooves and thereby substantially increase the operating life of said transmission belt.

2. A combination as set forth in claim 1 in which said greater center-to-center spacing between said V-belt elements of said transmission belt is at least one-half percent greater than said given spacing between said grooves in said sheave.

3. A combination as set forth in claim 1 in which said greater center-to-center spacing between said V-belt elements of said transmission belt is within the range of 0.5 and 2.0 percent greater than said given spacing between said grooves in said sheave.

4. A combination as set forth in claim 3 in which said plurality of V-belt elements of said transmission belt are substantially identical with each having a standard cross-sectional configuration and said plurality of grooves in said sheave are substantially identical with each having a peripheral outline which corresponds to said standard cross-sectional configuration.

5. A combination as set forth in claim 4 in which each of said V-belt elements of said transmission belt has a lower compression section, a load-carrying section in the central portion thereof, and an upper tension section, said tie band element of said transmission belt being bonded to each V-belt element adjacent the upper portion of its tension section and said tie band element being made of a material having physical properties very similar to the physical properties of said tension section so that with said transmission belt bending around said sheave said greater center-to-center distance spacing of said V-belt elements is more effectively reduced to provide said improved mating.

References Cited

UNITED STATES PATENTS

| 1,656,628 | 1/1928 | Gits | 74—234 |
| 1,729,329 | 9/1929 | Chilton. | |
| 2,728,239 | 12/1955 | Adams | 74—229 |
| 3,404,577 | 10/1968 | Zahn | 74—229 |

FOREIGN PATENTS 661,356  6/1938  Germany.

JAMES A. WONG, Primary Examiner

U.S. Cl. X.R.

74—233